United States Patent
Peters et al.

(10) Patent No.: US 12,163,515 B2
(45) Date of Patent: Dec. 10, 2024

(54) FLUID DELIVERY SYSTEM WITH LOAD-DEPENDENT ROTATIONAL SPEED REVERSAL OF A ROTARY PUMP

(71) Applicant: Schwäbische Hüttenwerke Automotive GmbH, Aalen (DE)

(72) Inventors: Sven Peters, Bad Schussenried (DE); Gerd Jäggle, Ertingen (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 82 days.

(21) Appl. No.: 18/073,054

(22) Filed: Dec. 1, 2022

(65) Prior Publication Data
US 2023/0175505 A1    Jun. 8, 2023

(30) Foreign Application Priority Data

Dec. 7, 2021    (DE) .................... 10 2021 132 217.0

(51) Int. Cl.
*F04C 14/04*    (2006.01)
*F04C 15/00*    (2006.01)
*F16H 57/04*    (2010.01)

(52) U.S. Cl.
CPC ............ *F04C 14/04* (2013.01); *F04C 15/008* (2013.01); *F16H 57/0443* (2013.01); *F16H 57/0453* (2013.01)

(58) Field of Classification Search
USPC ......................................................... 417/48
See application file for complete search history.

(56) References Cited

U.S. PATENT DOCUMENTS

| 3,800,913 A * | 4/1974 | Schmitt .................... F01M 1/12 74/606 R |
| 2006/0041362 A1* | 2/2006 | Chida ..................... F16H 59/72 701/101 |

(Continued)

FOREIGN PATENT DOCUMENTS

| DE | 102011083297 B3 | 11/2012 |
| DE | 102011055194 A1 | 5/2013 |

(Continued)

OTHER PUBLICATIONS

Machine Translation of DE102015220535 (Obtained from Applicant's Submitted Prior Art) (Year: 2022).*

(Continued)

*Primary Examiner* — Dominick L Plakkoottam
*Assistant Examiner* — Geoffrey S Lee
(74) *Attorney, Agent, or Firm* — Buchanan Ingersoll & Rooney PC (57) ABSTRACT

A fluid delivery system includes a reservoir for storing fluid, a rotary pump having a first pump port and a second pump port, a first fluid conduit connecting the first pump port to the reservoir, and a second fluid conduit connecting the second pump port to the reservoir. The rotary pump rotates in a first delivery direction in a normal mode and in a second delivery direction in an alternative mode. A first valve separates the first pump port from the reservoir when the rotary pump is in its alternative mode, and a second valve separates the second pump port from the reservoir when the rotary pump is in its normal mode.

16 Claims, 3 Drawing Sheets

(56) References Cited

U.S. PATENT DOCUMENTS

| | | | | |
|---|---|---|---|---|
| 2010/0187043 | A1* | 7/2010 | Murahashi | F16H 57/0434 |
| | | | | 184/6.3 |
| 2013/0121854 | A1* | 5/2013 | Thiel | F04B 9/02 |
| | | | | 417/313 |
| 2014/0234124 | A1* | 8/2014 | Ruhle | F16H 57/0473 |
| | | | | 417/364 |
| 2015/0046005 | A1* | 2/2015 | Kasuya | F16H 61/0025 |
| | | | | 180/65.265 |
| 2017/0184111 | A1* | 6/2017 | Brookes | F04D 1/00 |
| 2018/0073509 | A1* | 3/2018 | Madsen | F04D 9/02 |
| 2019/0145440 | A1* | 5/2019 | Fisher | F15B 1/26 |
| | | | | 60/325 |

FOREIGN PATENT DOCUMENTS

| | | | |
|---|---|---|---|
| DE | 102015220535 A1 * | 4/2017 | |
| DE | 102018007459 A1 | 3/2020 | |
| EP | 2667053 A2 | 11/2013 | |
| EP | 3093533 A2 | 11/2016 | |

OTHER PUBLICATIONS

Extended European Search Report for European Application No. 22207529.3, dated May 10, 2023 with translation, 12 pages.
German Search Report issued in German Patent Application No. 10 2021 132 217.0, mailed May 2, 2022, 20 pages. (with English translation).

* cited by examiner

FLUID DELIVERY SYSTEM WITH LOAD-DEPENDENT ROTATIONAL SPEED REVERSAL OF A ROTARY PUMP

CROSS REFERENCE TO RELATED APPLICATION

This application claims benefit of priority from German Patent Application No. 10 2021 132 217.0, filed Dec. 7, 2021. The contents of this application are incorporated herein by reference.

FIELD OF THE INVENTION

The invention relates to a fluid delivery system for supplying fluid to a machine assembly, in particular an engine or gear system of a motor vehicle. The invention relates in particular to supplying oil to a machine assembly for lubricating and/or cooling the machine assembly. The fluid delivery system comprises a reservoir for storing the fluid and a rotary pump which suctions the fluid from the reservoir and delivers it to the machine assembly.

BACKGROUND OF THE INVENTION

Classic fluid delivery systems for supplying fluid to a machine assembly, in particular in the motor vehicle sector for supplying fluid to an engine or gear system, are usually based on forced-feed lubrication, in particular wet-sump lubrication, using at least one pump which delivers the fluid, in particular oil, to the relevant point. In classic wet-sump lubrication, the fluid is collected in a reservoir, which is arranged below the machine assembly, as it drains from the machine assembly and is pumped off from the reservoir and fed back to the machine assembly by means of the pump.

Such fluid delivery systems comprising a wet sump have the disadvantage that they can for example suction air in extreme driving situations of the motor vehicle. Cornering and/or sharp acceleration or braking manoeuvres from a high speed of the motor vehicle, for example, can then result in the centrifugal forces created pressing the oil away from the aspiration point within the reservoir, such that air is also suctioned in addition to oil at the aspiration point or such that only air is suctioned at the aspiration point. This can result in an interruption to the supply of fluid to the machine assembly and, depending on the duration of the interruption and the temperature and/or state of the machine assembly, in particular the engine of the motor vehicle, can have fatal consequences. In the worst case scenario, this can result in damage to the engine and/or gear system of a motor vehicle.

Alternatives to classic wet-sump lubrication have therefore been developed which are intended to prevent air from being suctioned. The prior art also for example discloses fluid delivery systems in which the fluid can be suctioned from the reservoir at multiple mutually spaced aspiration points by multiple pumps within the reservoir. A wet-sump lubrication is then for example employed in which multiple pumps are distributed in the reservoir, such that at least one pump can always suction fluid and deliver it to the machine assembly.

The prior art also discloses fluid delivery systems, in particular wet-sump lubrication fluid delivery systems, in which the reservoir comprises so-called oil baffle blocks, in particular baffle plates or bulkhead plates, in order to prevent the fluid from being pressed away from the aspiration point when large centrifugal forces occur, in particular high transverse accelerations such as for example arise when cornering. In addition to the bulkhead plates, it has proven to be of value if the pump and/or aspiration point is formed at a very low point in the reservoir which is for example embodied as a funnel-shaped recess in the reservoir, such that sufficient fluid is as far as possible always provided in the region of the aspiration point, even in extreme driving situations.

One disadvantage of conventional wet-sump lubrication is that embodying the reservoir with a recess means among other things that it requires a lot of space, particularly vertically. This means that an engine featuring integrated wet-sump lubrication has to be installed relatively high up within the motor vehicle in order to have sufficient space available for the reservoir. The centre of gravity of motor vehicles featuring wet-sump lubrication is therefore relatively high up, which can have a negative effect on the handling of the motor vehicle.

If, for example, cornering continues over a longer period of time, even the baffle plates cannot completely prevent the fluid from being pressed away from the aspiration point. A recess in the reservoir can usually be omitted if multiple pumps are employed, however employing multiple pumps is among other things expensive and incurs a high energy requirement for operating the pumps.

So-called dry-sump lubrication has therefore been developed as an alternative to wet-sump lubrication. This is used in particular in high-performance engines and/or off-road or sports cars. Dry-sump lubrication involves the fluid being aspirated from an ancillary sump, into which the fluid flows back after it has been supplied to the machine assembly, by means of a pump and fed to a main sump. The main sump serves in turn to supply the machine assembly, by aspirating the fluid from the main sump by means of another pump and feeding it to the machine assembly.

Dry-sump lubrication has the advantage that it reliably lubricates the machine assembly, since it is less susceptible to centrifugal forces and oil is actively supplied to the aspiration point of the main sump. In addition, a large main sump can improve the cooling effect of the fluid, and a flat ancillary sump which is embodied below the machine assembly can reduce the overall height of the machine assembly, thus enabling the centre of gravity of the motor vehicle to be lowered. The latter is in particular advantageous for flat motor vehicles such as for example sports cars. Also, the main sump can be installed at any location, since the fluid from the machine assembly initially drains into the ancillary sump and is actively delivered to the main sump.

This type of forced-feed lubrication is very reliable in terms of supplying fluid to the machine assembly, but it is susceptible to faults due to the large number of additional components and is above all costly, since as well as an additional pump which delivers the fluid from the ancillary sump to the main sump, dry-sump lubrication also requires another reservoir. Dry-sump lubrication also generally requires more space overall than wet-sump lubrication, in particular because of the main sump.

SUMMARY OF THE INVENTION

Therefore, and aspect of the invention is a fluid delivery system which reliably prevents air from being suctioned and can be manufactured in a space-saving and inexpensive way.

The fluid delivery system for supplying fluid to a machine assembly, in particular an engine or gear system of a motor vehicle, comprises a reservoir for storing the fluid. The fluid delivery system is preferably a forced-feed lubrication fluid delivery system, in particular a wet-sump lubrication fluid delivery system. In particular, the fluid delivery system is not a dry-sump lubrication fluid delivery system. The fluid delivery system is preferably the wet-sump lubrication fluid delivery system of an engine of a motor vehicle. The fluid can be oil for lubricating and/or cooling the machine assembly.

The reservoir can be embodied as a flat reservoir. The reservoir can in particular exhibit a length which is larger by a multiple and in particular by twice than the width of the reservoir. The width and length of the reservoir preferably extend in a horizontal direction when the reservoir is installed, in particular in a motor vehicle. The reservoir preferably exhibits a depth which is smaller by a multiple and in particular by half than the length and preferably width of the reservoir. The depth of the reservoir preferably extends in a vertical direction when the reservoir is installed, in particular in a motor vehicle. The reservoir preferably exhibits an extent in the longitudinal and width directions which is greater than the depth of the reservoir. The reservoir can in particular be embodied in the form of a flat tray.

The reservoir can in particular comprise an opening on a side which faces the machine assembly, wherein the fluid can pass, in particular flow, from the machine assembly back to the reservoir through said opening. The reservoir can be embodied below the machine assembly. The reservoir can in particular be embodied at a lowest point of the machine assembly. The reservoir can be connected, in particular screwed, to the housing of the machine assembly. The reservoir can in particular be a part of the housing of the machine assembly.

In preferred embodiments, the reservoir is an oil tray of a motor vehicle which is arranged at the lowest point of the engine of the motor vehicle. In particular, the reservoir is preferably connected, in particular screwed, to the crankcase of an engine of a motor vehicle.

The reservoir can be manufactured from metal or plastic, in particular in an original-moulding method or a reshaping method. The reservoir can preferably be manufactured by reshaping, in particular deep-drawing. In alternative embodiments, the reservoir can be manufactured in an original-moulding method, in particular a casting method. In preferred embodiments, the reservoir is manufactured from sheet material, in particular sheet metal, by deep-drawing.

In alternative embodiments, the reservoir can be produced using a joining method, in particular a thermal joining method. The reservoir can then for example be manufactured from multiple sheets of material, in particular metal, which are welded together. The reservoir can also comprise a base body which is manufactured in an original-moulding method or reshaping method and connected in one piece to additional components, for example sheets of material, by means of a joining method.

The fluid delivery system also comprises a rotary pump having a first pump port and a second pump port. The rotary pump can for example be formed as a vane pump, pendulum-slider pump or gear pump. The fluid delivery system also comprises a drive for the rotary pump. The drive can for example be formed as an electric motor. In alternative embodiments, the rotary pump can be driven by the machine assembly to which the fluid is to be supplied, wherein a gear system for transmitting the rotational speed and/or rotational direction is preferably arranged between the machine assembly and the rotary pump. The gear system can preferably be embodied such that it can change the delivery direction of the rotary pump independently of the initial rotational direction.

The rotary pump can be operated in a normal mode and in an alternative mode. In its normal mode, the rotary pump—in particular, an impeller of the rotary pump—can rotate in a first delivery direction, and in its alternative mode, the rotary pump—in particular, the impeller of the rotary pump—can rotate in a second delivery direction. The second delivery direction can be opposite to the first delivery direction. The rotary pump can alternate between its alternative mode and normal mode. In particular, the delivery direction of the rotary pump can be controlled such that the rotary pump can alternative between its normal mode and alternative mode.

The rotary pump is designed to suction fluid from the reservoir and discharge it to the machine assembly, irrespective of its operating state. The rotary pump can suction fluid from the reservoir in both its normal mode and alternative mode. The rotary pump can be arranged in the reservoir. In alternative embodiments, the rotary pump can be arranged outside of the reservoir and for example connected to the reservoir via fluid conduits. Once the fluid has for example lubricated and/or cooled the machine assembly, it can flow from the machine assembly back to the reservoir. The fluid delivery system thus represents a fluid circuit.

Depending on the delivery direction of the rotary pump, the first pump port can form an inlet, in particular a housing inlet, or an outlet, in particular a housing outlet, of the rotary pump. Also depending on the delivery direction of the rotary pump, the second pump port can form an inlet, in particular a housing inlet, or an outlet, in particular a housing outlet, of the rotary pump.

When the rotary pump is in its normal mode, the first pump port preferably forms the pump inlet. The first pump port is in particular embodied on a low-pressure side of the rotary pump when the rotary pump is in its normal mode. Correspondingly, the second pump port preferably forms the pump outlet of the rotary pump when the rotary pump is in its normal mode. The second pump port is in particular embodied on a high-pressure side of the rotary pump when the rotary pump is in its normal mode.

When the rotary pump is in its alternative mode, the second pump port preferably forms the pump inlet. The second pump port is in particular embodied on the low-pressure side of the rotary pump when the rotary pump is in its alternative mode. Correspondingly, the first pump port preferably forms the pump outlet of the rotary pump when the rotary pump is in its alternative mode. The first pump port is in particular embodied on the high-pressure side of the rotary pump when the rotary pump is in its alternative mode.

When the rotary pump is in its normal mode, it can suction fluid from the reservoir via the first pump port. The rotary pump can also discharge the fluid via the second pump port when it is in its normal mode. When the rotary pump is in its alternative mode, it can suction fluid from the reservoir via the second pump port. The rotary pump can also discharge the fluid via the first pump port when it is in its alternative mode.

The fluid delivery system can comprise a first fluid conduit featuring a first valve and a second fluid conduit featuring a second valve. Irrespective of whether the rotary pump is arranged within and/or outside the reservoir, the fluid delivery system can comprise a first fluid conduit featuring a first valve and a second fluid conduit featuring a second valve. The first fluid conduit can connect the first pump port to the reservoir, and the second fluid conduit can connect the second pump port to the reservoir. The first fluid conduit can in particular extend from the first pump port up to a first aspiration point in the reservoir. The first fluid conduit preferably connects the first pump port directly to the reservoir via the first valve. The second fluid conduit can in particular extend from the second pump port up to a second aspiration point in the reservoir. The second fluid conduit preferably connects the second pump port directly to the reservoir via the second valve.

When the rotary pump is in its normal mode, the second valve can separate the second pump port from the reservoir. The second valve can in particular close the second fluid conduit when the rotary pump is in its normal mode. When the rotary pump is in its alternative mode, the first valve can separate the first pump port from the reservoir. The first valve can in particular close the first fluid conduit when the rotary pump is in its alternative mode.

When it is in its normal mode, the rotary pump can suction the fluid via the first pump port and discharge it via the second pump port. When the rotary pump is in its alternative mode, it can suction the fluid via the second pump port and discharge it via the first pump port.

The first fluid conduit preferably emerges into the reservoir at a first aspiration point. The second fluid conduit preferably emerges into the reservoir at a second aspiration point. The first aspiration point and the second aspiration point can be spaced apart from each other. The first aspiration point and the second aspiration point can in particular be spaced apart from each other in the horizontal direction of the reservoir, in particular when the reservoir is installed. The first aspiration point and the second aspiration point are preferably spaced apart from each other in the longitudinal direction of the reservoir. The first aspiration point and the second aspiration point can be embodied to be level with each other in the reservoir. The first aspiration point and the second aspiration point can in particular be level with each other in the vertical direction of the reservoir, in particular when the reservoir is installed. In alternative embodiments, the first aspiration point and the second aspiration point can be embodied to not be level with each other in the reservoir. The first aspiration point and the second aspiration point are preferably embodied such that they are spatially separated from each other within the reservoir.

The first valve is preferably embodied between the first pump port and the first aspiration point. The first valve can be embodied in the region of the first aspiration point. The first valve can in particular be embodied at the end of the first fluid conduit which faces the reservoir. The second valve is preferably embodied between the second pump port and the second aspiration point. The second valve can be embodied in the region of the second aspiration point. The second valve can in particular be embodied at the end of the second fluid conduit which faces the reservoir.

The reservoir can comprise a main sump and an ancillary sump. The reservoir can also comprise an overflow via which the main sump and the ancillary sump are fluidically connected to each other. In preferred embodiments, the fluid flows from the engine assembly back to the main sump. In alternative embodiments, the fluid can flow from the engine assembly back to the main sump and the ancillary sump.

The fluid can also flow from the main sump to the ancillary sump and/or from the ancillary sump to the main sump via the overflow. The overflow can be formed as a separating wall in the reservoir, the extent of which in the depth direction of the reservoir is smaller than the depth of the reservoir. In alternative embodiments, the overflow can be formed as a separating wall which comprises at least one cavity via which the main sump and the ancillary sump are fluidically connected.

The overflow preferably serves as a kind of baffle plate which delineates the holding volume of the main sump from the holding volume of the ancillary sump. The overflow can prevent the entire fluid within the reservoir from being forced to one side of the reservoir when transverse accelerations occur, for example when cornering and/or accelerating or braking from a high speed. The overflow can in particular ensure that sufficient fluid is available in the main sump and/or in the ancillary sump once the transverse forces have ceased to occur, such that the first aspiration point and/or the second aspiration point are situated below the fluid level within the main sump and/or ancillary sump.

The main sump can exhibit a larger or smaller fluid capacity than the ancillary sump. In alternative embodiments, the main sump and the ancillary sump can exhibit the same fluid capacity. The main sump and the ancillary sump preferably exhibit the same depth. In alternative embodiments, the main sump can be embodied to be deeper than the ancillary sump. It is also possible for the ancillary sump to be embodied to be deeper than the main sump. The main sump and the ancillary sump can exhibit the same extent widthwise. In alternative embodiments, the main sump can exhibit a greater extent widthwise than the ancillary sump. It is also possible for the ancillary sump to exhibit a greater extent widthwise than the main sump.

Preferably, the first aspiration point emerges into the main sump and the second aspiration point emerges into the ancillary sump. In alternative embodiments, the first aspiration point can emerge into the ancillary sump and the second aspiration point can emerge into the main sump.

The fluid delivery system can also comprise a third fluid conduit featuring a third valve. The third fluid conduit can connect the second pump port to the machine assembly. The fluid delivery system can also comprise a fourth fluid conduit featuring a fourth valve. The fourth fluid conduit preferably connects the first pump port to the machine assembly.

The third fluid conduit can emerge into the second fluid conduit at its end which faces away from the machine assembly. The fourth fluid conduit can emerge into the first fluid conduit at its end which faces away from the machine assembly.

In alternative embodiments, the third fluid conduit can be connected directly to the second pump port at its end which faces away from the machine assembly. The second fluid conduit can also emerge into the third fluid conduit at its end which faces away from the reservoir. In alternative embodiments, the fourth fluid conduit can also be connected to the first pump port at its end which faces away from the machine assembly. The first fluid conduit can also emerge into the fourth fluid conduit at its end which faces away from the reservoir. The first pump port can thus be connected directly to both the first fluid conduit and the fourth fluid conduit. The second pump port can also be connected directly to the second fluid conduit and the third fluid conduit.

Preferably, the first pump port is connected to the fourth fluid conduit via the first fluid conduit and/or the second pump port is connected to the third fluid conduit via the second fluid conduit. The third fluid conduit can emerge into the fourth fluid conduit via its end which faces the machine assembly. The third fluid conduit can in particular emerge into the fourth fluid conduit between the fourth valve and the machine assembly. In alternative embodiments, the third fluid conduit can be connected to the machine assembly without emerging into the fourth fluid conduit. The fourth fluid conduit can also emerge into the third fluid conduit via its end which faces the machine assembly. The fourth fluid conduit can in particular emerge into the third fluid conduit between the third valve and the machine assembly. In preferred embodiments, the fourth fluid conduit can be connected to the machine assembly without emerging into the third fluid conduit.

The third valve is preferably embodied between the second pump port and the machine assembly. The third valve can in particular be embodied between the machine assembly and the intersection at which the third fluid conduit can emerge into the second fluid conduit. The fourth valve is preferably embodied between the first pump port and the machine assembly. The fourth valve can in particular be embodied between the machine assembly and the intersection at which the fourth fluid conduit can emerge into the first fluid conduit.

The second valve is preferably embodied between the second aspiration point and the intersection at which the third fluid conduit can emerge into the second fluid conduit. The first valve is preferably embodied between the first aspiration point and the intersection at which the fourth fluid conduit can emerge into the first fluid conduit.

When the rotary pump is in its alternative mode, the third valve can prevent a fluid flow outside a delivery chamber of the rotary pump from the first pump port to the second pump port. The third valve can in particular close the third fluid conduit when the rotary pump is in its alternative mode. When the rotary pump is in its normal mode, the fourth valve can prevent a fluid flow outside the delivery chamber of the rotary pump from the second pump port to the first pump port. The fourth valve can in particular close the fourth fluid conduit when the rotary pump is in its normal mode.

The first valve can exhibit a release position and a blocking position. The first valve can permit a fluid flow through the first valve in the release position. The first valve can in particular permit a fluid flow through the first fluid conduit from the first aspiration point to the first pump port in the release position. The first valve can prevent a fluid flow through the first valve in the blocking position. The first valve can in particular prevent a fluid flow through the first fluid conduit from the first aspiration point to the first pump port in the blocking position. The first valve is preferably situated in the release position when the rotary pump is in its normal mode. The first valve is preferably situated in the blocking position when the rotary pump is in its alternative mode.

The second valve can exhibit a release position and a blocking position. The second valve can permit a fluid flow through the second valve in the release position. The second valve can in particular permit a fluid flow through the second fluid conduit from the second aspiration point to the second pump port in the release position. The second valve can prevent a fluid flow through the second valve in the blocking position. The second valve can in particular prevent a fluid flow through the second fluid conduit from the second aspiration point to the second pump port in the blocking position. The second valve is preferably situated in the blocking position when the rotary pump is in its normal mode. The second valve is preferably situated in the release position when the rotary pump is in its alternative mode.

The third valve can exhibit a release position and a blocking position. The third valve can permit a fluid flow through the third valve in the release position. The third valve can in particular permit a fluid flow through the third fluid conduit from the intersection at which the third fluid conduit can emerge into the second fluid conduit at its end which faces away from the machine assembly, in particular up to the intersection at which the third fluid conduit can emerge into the fourth fluid conduit at its end which faces the machine assembly, in the release position. The third valve can prevent a fluid flow through the third valve in the blocking position. The third valve can in particular prevent a fluid flow through the third fluid conduit from the intersection at which the third fluid conduit can emerge into the second fluid conduit at its end which faces away from the machine assembly up to the machine assembly, in particular up to the intersection at which the third fluid conduit can emerge into the fourth fluid conduit at its end which faces the machine assembly, in the blocking position. The third valve is preferably situated in the release position when the rotary pump is in its normal mode. The third valve is preferably situated in the blocking position when the rotary pump is in its alternative mode.

The fourth valve can exhibit a release position and a blocking position. The fourth valve can permit a fluid flow through the fourth valve in the release position. The fourth valve can in particular permit a fluid flow through the fourth fluid conduit from the intersection at which the fourth fluid conduit can emerge into the first fluid conduit at its end which faces away from the machine assembly up to the machine assembly, in particular up to the intersection at which the fourth fluid conduit can emerge into the third fluid conduit at its end which faces the machine assembly, in the release position. The fourth valve can prevent a fluid flow through the fourth valve in the blocking position. The fourth valve can in particular prevent a fluid flow through the fourth fluid conduit from the intersection at which the fourth fluid conduit can emerge into the first fluid conduit at its end which faces away from the machine assembly up to the machine assembly, in particular up to the intersection at which the fourth fluid conduit can emerge into the third fluid conduit at its end which faces the machine assembly, in the blocking position. The fourth valve is preferably situated in the blocking position when the rotary pump is in its normal mode. The fourth valve is preferably situated in the release position when the rotary pump is in its alternative mode.

The second valve and the fourth valve are preferably situated in the blocking position when the rotary pump is in its normal mode. The second valve and the fourth valve are preferably situated in the release position when the rotary pump is in its alternative mode. Preferably, the rotary pump cannot therefore suction fluid from the reservoir via the second fluid conduit and discharge it to the machine assembly via the fourth fluid conduit when it is in its normal mode. Preferably, the rotary pump can therefore suction fluid from the reservoir via the second fluid conduit and discharge it to the machine assembly via the fourth fluid conduit when it is in its alternative mode.

The first valve and the third valve are preferably situated in the blocking position when the rotary pump is in its alternative mode. The first valve and the third valve are preferably situated in the release position when the rotary pump is in its normal mode. Preferably, the rotary pump can therefore suction fluid from the reservoir via the first fluid conduit and discharge it to the machine assembly via the third fluid conduit when it is in its normal mode. Preferably, the rotary pump cannot therefore suction fluid from the reservoir via the first fluid conduit and discharge it to the machine assembly via the third fluid conduit when it is in its alternative mode.

The first valve is preferably formed by a check valve. In particular, the first valve is preferably formed by a reflux valve, wherein the blocking body of the first valve is pressed into the valve seating when the rotary pump is in its alternative mode. In particular, the fluid pressure in the first fluid conduit can ensure that the first valve assumes the blocking position when the rotary pump is in its alternative mode. The blocking body of the first valve can in particular be pressed into the valve seating by the fluid pressure in the first fluid conduit when the rotary pump is in its alternative mode.

The second valve is preferably formed by a check valve. In particular, the second valve is preferably formed by a reflux valve, wherein the blocking body of the second valve is pressed into the valve seating when the rotary pump is in its normal mode. In particular, the fluid pressure in the second fluid conduit can ensure that the second valve assumes the blocking position when the rotary pump is in its normal mode. The blocking body of the second valve can in particular be pressed into the valve seating by the fluid pressure in the second fluid conduit when the rotary pump is in its normal mode.

The third valve is preferably formed by a check valve. In particular, the third valve is preferably formed by a reflux valve, wherein the blocking body of the third valve is pressed into the valve seating when the rotary pump is in its alternative mode. In particular, the fluid pressure in the third fluid conduit can ensure that the third valve assumes the release position when the rotary pump is in its normal mode. The blocking body of the third valve can in particular be pressed into the valve seating by the fluid pressure in the third fluid conduit when the rotary pump is in its alternative mode.

The fourth valve is preferably formed by a check valve. In particular, the fourth valve is preferably formed by a reflux valve, wherein the blocking body of the fourth valve is pressed into the valve seating when the rotary pump is in its normal mode. In particular, the fluid pressure in the fourth fluid conduit can ensure that the fourth valve assumes the blocking position when the rotary pump is in its normal mode. The blocking body of the fourth valve can in particular be pressed into the valve seating by the fluid pressure in the fourth fluid conduit when the rotary pump is in its normal mode.

The fluid delivery system can additionally comprise at least one filter device. The filter device preferably filters the fluid before it flows from the pump to the machine assembly. Alternatively, or additionally, the fluid delivery system can comprise a filter device which filters the fluid before it passes from the reservoir to the pump.

The drive for driving the rotary pump is preferably formed by an electric motor. The fluid delivery system preferably comprises a motor controller for actuating the electric motor. The motor controller can preferably comprise monitoring electronics. The monitoring electronics of the motor controller are preferably designed to detect whether the rotary pump is suctioning air. The monitoring electronics are in particular designed to detect whether the rotary pump is suctioning air through the first and/or second fluid conduit.

The motor can in particular be controlled on the basis of a number of characteristic curves or characteristic diagrams which contain the power consumption of the electric motor as a function of the rotational speed of the rotary pump and/or electric motor when the pump is operating normally, without suctioning air. The influence of the temperature of the fluid and/or rotary pump on the power consumption of the electric motor, in particular as a function of the rotational speed of the pump and/or the rotational speed of the electric motor, can also be included in the characteristic curves or characteristic diagrams. In particular, threshold values can be defined which the power consumption as a function of the rotational speed of the rotary pump and/or electric motor and/or a temperature of the fluid and/or rotary pump should not fall below.

The monitoring electronics of the fluid delivery system are preferably provided to monitor the power consumption of the electric motor as a function of an actual rotational speed of the rotary pump and/or electric motor and/or an actual temperature of the fluid and/or rotary pump. The motor controller can also change the rotational direction of the electric motor when the power consumption as a function of the actual rotational speed of the rotary pump and/or electric motor and/or the actual temperature of the fluid and/or rotary pump falls below a threshold value.

The motor controller can in particular change the rotational direction of the electric motor for at least one second, in particular at least five seconds, when the power consumption as a function of the actual rotational speed of the rotary pump and/or electric motor and/or the actual temperature of the fluid and/or rotary pump falls below the threshold value. In alternative embodiments, when the power consumption as a function of the actual rotational speed of the rotary pump and/or electric motor and/or the actual temperature of the fluid and/or rotary pump falls below the threshold value, the motor controller can change the rotational direction of the electric motor until the power consumption exceeds the threshold value again.

Changing the rotational direction of the electric motor preferably also changes the rotational direction of the rotary pump. Changing the rotational direction of the electric motor can switch the rotary pump can switch from its normal mode to its alternative mode and/or from its alternative mode to its normal mode. The motor controller can thus also switch the rotary pump from its normal mode to its alternative mode and/or from its alternative mode to its normal mode. Preferably, the rotational speed of the rotary pump is directly proportional to the rotational speed of the electric motor. The rotational speed of the rotary pump is preferably equal to the rotational speed of the electric motor.

The motor controller can obtain the actual rotational speed of the rotary pump and/or electric motor from tachometers. The motor controller can also obtain the actual temperature of the fluid and/or rotary pump from temperature measuring probes. The monitoring electronics can comprise at least one tachometer for determining the actual rotational speed of the rotary pump and/or electric motor. The monitoring electronics can also comprise at least one temperature measuring probe for determining the actual temperature of the fluid and/or rotary pump.

The functioning of the fluid delivery system shall be described below.

When the rotary pump is in its normal mode, it preferably aspirates fluid from the reservoir, in particular from the main sump of the reservoir, via the first aspiration point and the first fluid conduit. The first valve of the first fluid conduit is preferably situated in the release position when the rotary pump is in its normal mode. For as long as the rotary pump is in its normal mode, the suctioned fluid is preferably delivered to the machine assembly via the third fluid conduit and the third valve.

If a shortage of fluid then occurs in the region of the first aspiration point in the reservoir, in particular in the main sump of the reservoir, such that the first aspiration point is no longer completely below the fluid level, air can also be suctioned in addition to fluid. Such a shortage of fluid can for example occur in a motor vehicle when cornering or when performing a braking or accelerating manoeuvre, if the fluid is pressed away from the aspiration point by the centrifugal forces generated. This means in particular that the drive of the rotary pump does not have to apply as much power in order to maintain the rotational speed of the rotary pump. In particular where the drive is formed by an electric motor, this means that the power consumption of the electric motor drops.

The motor controller of the electric motor, in particular the monitoring electronics, can determine the drop in power consumption and compare it with a threshold value to be determined or a defined threshold value of the power consumption as a function of the actual rotational speed of the rotary pump and/or electric motor and/or the actual temperature of the fluid and/or rotary pump. If the power consumption falls below the threshold value, the motor controller can change the rotational direction of the electric motor and thus the rotational direction of the rotary pump.

The rotary pump can consequently be in its alternative mode and can suction fluid from the reservoir, in particular from the ancillary sump, via the second pump port, the second fluid conduit and the second aspiration point. The fluid can then be discharged to the machine assembly via the first pump port and in particular via the fourth fluid conduit.

An aspect of the invention also comprises a method for operating a fluid delivery system for supplying fluid to a machine assembly. The fluid delivery system is preferably the fluid delivery system described above. The fluid delivery system of the method for operating a fluid delivery system for supplying fluid to a machine assembly preferably comprises an electric motor which rotates in a first rotational direction in a normal mode and in a second rotational direction in an alternative mode. The electric motor preferably drives a rotary pump which, when the electric motor is in its normal mode, suctions the fluid from a reservoir via a first pump port and discharges it via a second pump port. When the electric motor is in its alternative mode, the rotary pump also preferably suctions the fluid from the reservoir via the second pump port and preferably discharges the fluid via the first pump port. The motor controller preferably comprises monitoring electronics.

The method for operating a fluid delivery system for supplying fluid to a machine assembly preferably comprises the following steps.

Firstly, the power consumption of the electric motor is preferably detected. This can be achieved by the monitoring electronics which preferably comprise an ammeter for this purpose. In a subsequent step, the actual rotational speed of the rotary pump and/or the actual temperature of the fluid and/or rotary pump is preferably detected. In order to detect the actual rotational speed of the rotary pump and/or the actual temperature of the fluid and/or rotary pump, the fluid delivery system preferably comprises sensors, for example temperature measuring probes and/or tachometers. In alternative embodiments, it is also possible to detect the actual rotational speed of the electric motor as well as the actual rotational speed of the rotary pump.

In a subsequent step, the power consumption of the electric motor is preferably compared with a threshold value for the power consumption, wherein the threshold value can be predetermined or determined as a function of the detected actual rotational speed of the rotary pump or electric motor and/or the actual temperature of the fluid and/or rotary pump.

If the power consumption of the electric motor falls below the threshold value, the motor controller preferably switches the electric motor from its normal mode to its alternative mode or from its alternative mode to its normal mode. In alternative embodiments, the motor controller can switch the electric motor from its normal mode to its alternative mode for at least one second, in particular for at least five seconds, when the power consumption of the electric motor falls below the threshold value.

BRIEF DESCRIPTION OF THE DRAWINGS

The invention shall be described below on the basis of example embodiments. The invention is described in the following on the basis of example embodiments. The features disclosed in the example embodiments advantageously develop the subject-matter of the claims and the embodiments described above.

There is shown.

DETAILED DESCRIPTION OF THE INVENTION

Figure 1:
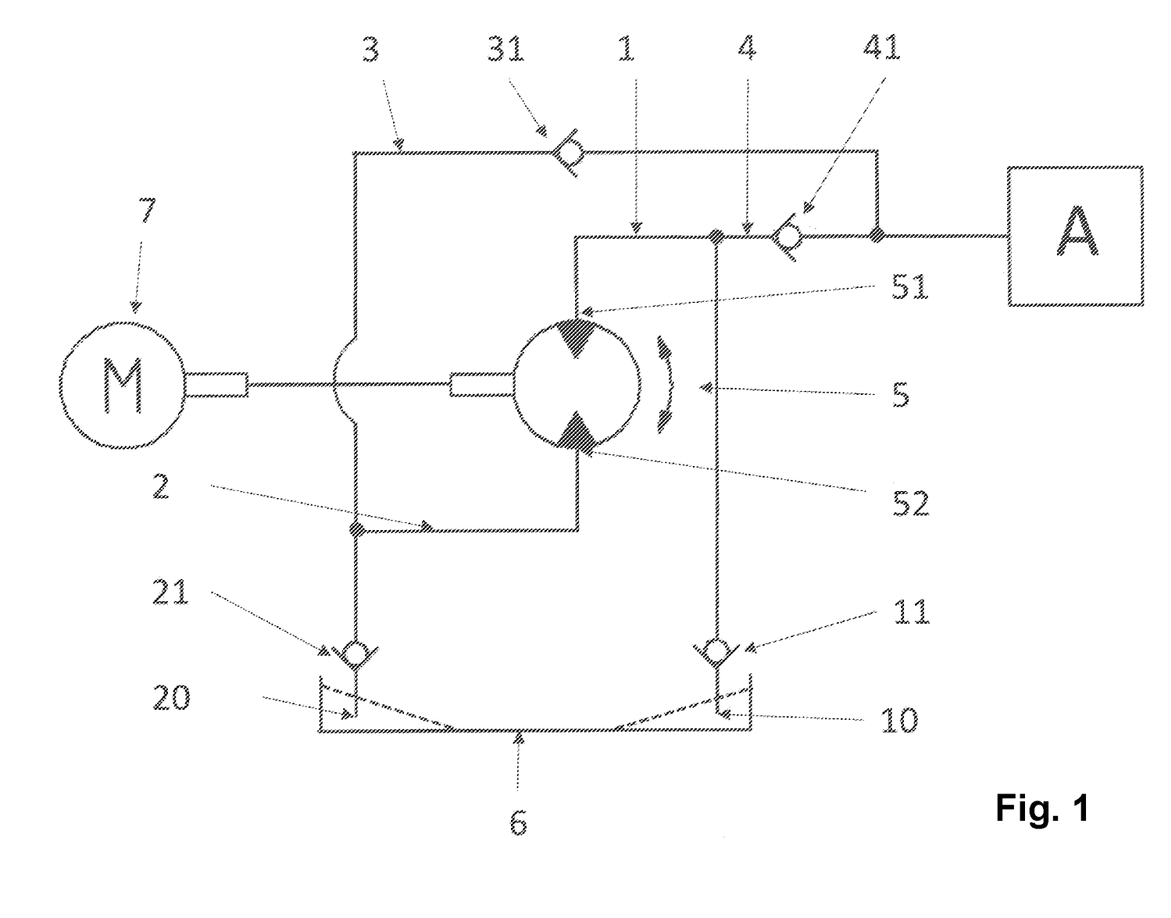
FIG. 1 a hydraulic circuit diagram according to a first example embodiment.

FIG. 1 shows a fluid delivery system according to a first example embodiment. The fluid delivery system comprises a rotary pump 5 having a first pump port 51 and a second pump port 52. The rotary pump 5 can be operated in a normal mode, in which it rotates in a first rotational direction, and an alternative mode in which it rotates in a second rotational direction. The fluid delivery system also comprises a reservoir 6 from which the rotary pump 5 can suction fluid and deliver it to a machine assembly A. The machine assembly A is preferably the engine and/or gear system of a motor vehicle. Once the fluid has for example lubricated and/or cooled the machine assembly A, it can flow from the machine assembly A back to the reservoir 6. The fluid delivery system thus represents a fluid circuit. Contrary to the representation in FIG. 1, the reservoir 6 is preferably embodied below the machine assembly A, in particular at a lowest point of the machine assembly A, such that the fluid can flow back into the reservoir 6 due to gravity. The reservoir 6 can in particular be part of the machine assembly A and for example form the lower part of an assembly housing.

The reservoir 6 is preferably embodied as a flat reservoir. The reservoir 6 can in particular be embodied in the form of a flat tray. The reservoir 6 is preferably connected, in particular screwed, to the housing of the machine assembly A. The reservoir 6 can be manufactured from metal or plastic, in particular in an original-moulding method or a reshaping method. The reservoir 6 can preferably be manufactured from sheet material, in particular by deep-drawing.

The first pump port 51 is fluidically connected to the reservoir 6 via a first fluid conduit 1. The first fluid conduit 1 extends from the first pump port 51 via a first valve 11 up to a first aspiration point 10 formed in the reservoir 6. The first valve 11 is embodied in the form of a reflux valve which can assume a release position and a blocking position. When the rotary pump 5 is in its normal mode, in which it rotates in a first rotational direction, the first valve 11 is situated in the release position and opens the first fluid conduit 1, such that fluid can be suctioned from the reservoir 6 by the rotary pump 5 via the first pump port 51. When the rotary pump 5 is in its alternative mode, the first valve 11 is situated in the blocking position, such that fluid cannot pass to the reservoir 6 via the first pump port 51 and the first fluid conduit 1. In particular, the fluid pressure in the first fluid conduit 1 ensures that a blocking body of the first valve 11 is pressed into the valve seating and closes the first valve 11 when the rotary pump 5 is in its alternative mode.

The second pump port 52 is fluidically connected to the reservoir 6 via a second fluid conduit 2. The second fluid conduit 2 extends from the second pump port 52 via a second valve 12 up to a second aspiration point 20 formed in the reservoir 6. The second valve 12 is embodied in the form of a reflux valve which can assume a release position and a blocking position. When the rotary pump 5 is in its alternative mode, in which it rotates in a second rotational direction, the second valve 12 is situated in its release position and opens the second fluid conduit 2, such that fluid can be suctioned from the reservoir 6 by the rotary pump 5 via the second pump port 52. When the rotary pump 5 is in its normal mode, the second valve 12 is situated in the blocking position, such that fluid cannot pass to the reservoir 6 via the second pump port 52 and the second fluid conduit 2. In particular, the fluid pressure in the second fluid conduit 2 ensures that a blocking body of the second valve 12 is pressed into the valve seating and closes the second valve 12 when the rotary pump 5 is in its normal mode.

The first pump port 51 is connected to the machine assembly A via a fourth fluid conduit 4 having a fourth valve 41. The fourth fluid conduit 4 emerges into the first fluid conduit 1 at its end which faces away from the machine assembly A. The fourth valve 41 is arranged between the machine assembly A and the intersection at which the fourth fluid conduit 4 emerges into the first fluid conduit 1 at its end which faces away from the machine assembly A.

The fourth valve 41 is embodied in the form of a check valve which exhibits a release position, in which the fourth valve 41 opens the fourth fluid conduit 4, and a blocking position in which the fourth valve 41 closes the fourth valve conduit 4. When the fourth valve 41 is in its release position, fluid can pass from the first pump port 51 to the machine assembly A via the fourth valve conduit 4 and in particular via the first fluid conduit 1. The fourth valve 41 is situated in the release position when the rotary pump 5 is in its alternative mode and in the blocking position when the rotary pump 5 is in its normal mode. In particular, the fluid pressure in the first fluid conduit 1 and the fourth fluid conduit 4 ensures that a blocking body of the fourth valve 41 is pressed out of the valve seating when the rotary pump 5 is in its alternative mode, such that the fourth valve 41 assumes its release position. When the rotary pump 5 is in its normal mode, the fourth valve 41 can in particular prevent a fluid flow outside the delivery chamber of the rotary pump 5 from the second pump port 52 to the first pump port 51, such that fluid can only pass from the second pump port 52 to the first pump port 51 through the delivery chamber.

The second pump port 52 is connected to the machine assembly A via a third fluid conduit 3 having a third valve 31. The third fluid conduit 3 emerges into the second fluid conduit 2 at its end which faces away from the machine assembly A. The third fluid conduit 3 also emerges into the fourth fluid conduit 4 at its end which faces the machine assembly A. The third valve 31 is embodied between the intersection at which the third fluid conduit 3 emerges into the second fluid conduit 2 at its end which faces away from the machine assembly A and the intersection at which the third fluid conduit 3 emerges into the fourth fluid conduit 4 at its end which faces the machine assembly A.

The third valve 31 is embodied in the form of a check valve which can assume a release position and a blocking position. When the third valve 31 is in its release position, fluid can pass from the second pump port 52 to the machine assembly A via the third fluid conduit 3 and in particular via the second fluid conduit 2 and the third fluid conduit 3. The third valve 31 is situated in the release position when the rotary pump 5 is in its normal mode and in the blocking position when the rotary pump 5 is in its alternative mode. In particular, the fluid pressure in the third fluid conduit 3 ensures that a blocking body of the third valve 31 is pressed out of the valve seating when the rotary pump 5 is in its normal mode, such that the third valve 31 assumes its release position. When the rotary pump 5 is in its alternative mode, the third valve 31 can in particular prevent a fluid flow outside the delivery chamber of the rotary pump 5 from the first pump port 51 to the second pump port 52, such that fluid can only pass from the first pump port 51 to the second pump port 52 through the delivery chamber.

The rotary pump 5 is driven by an electric motor 7. The fluid delivery system comprises a motor controller for actuating the electric motor 7. The motor controller preferably comprises monitoring electronics which are designed to detect whether the rotary pump 5 is suctioning air via one of the aspiration points 10, 20. The monitoring electronics of the fluid delivery system are provided to monitor the power consumption of the electric motor 7 as a function of an actual rotational speed of the rotary pump 5 and/or electric motor 7 and as a function of the temperature of the rotary pump 5 or fluid. If the power consumption drops below a threshold value to be determined or a defined threshold value, the rotational direction of the electric motor 7 and thus the rotational direction of the rotary pump 5 is changed, i.e. when the power consumption drops below a threshold value, the motor controller switches the electric motor 7 and therefore the rotary pump 5 from its normal mode to its alternative mode.

The motor controller can change the rotational direction of the electric motor 7 for at least one second, in particular at least five seconds, or it leaves the rotational direction of the electric motor 7 as it is until the threshold value of the power consumption as a function of the actual rotational speed of the rotary pump 5 and/or the actual temperature of the fluid and/or rotary pump 5 drops below a threshold value again.

Figure 2:
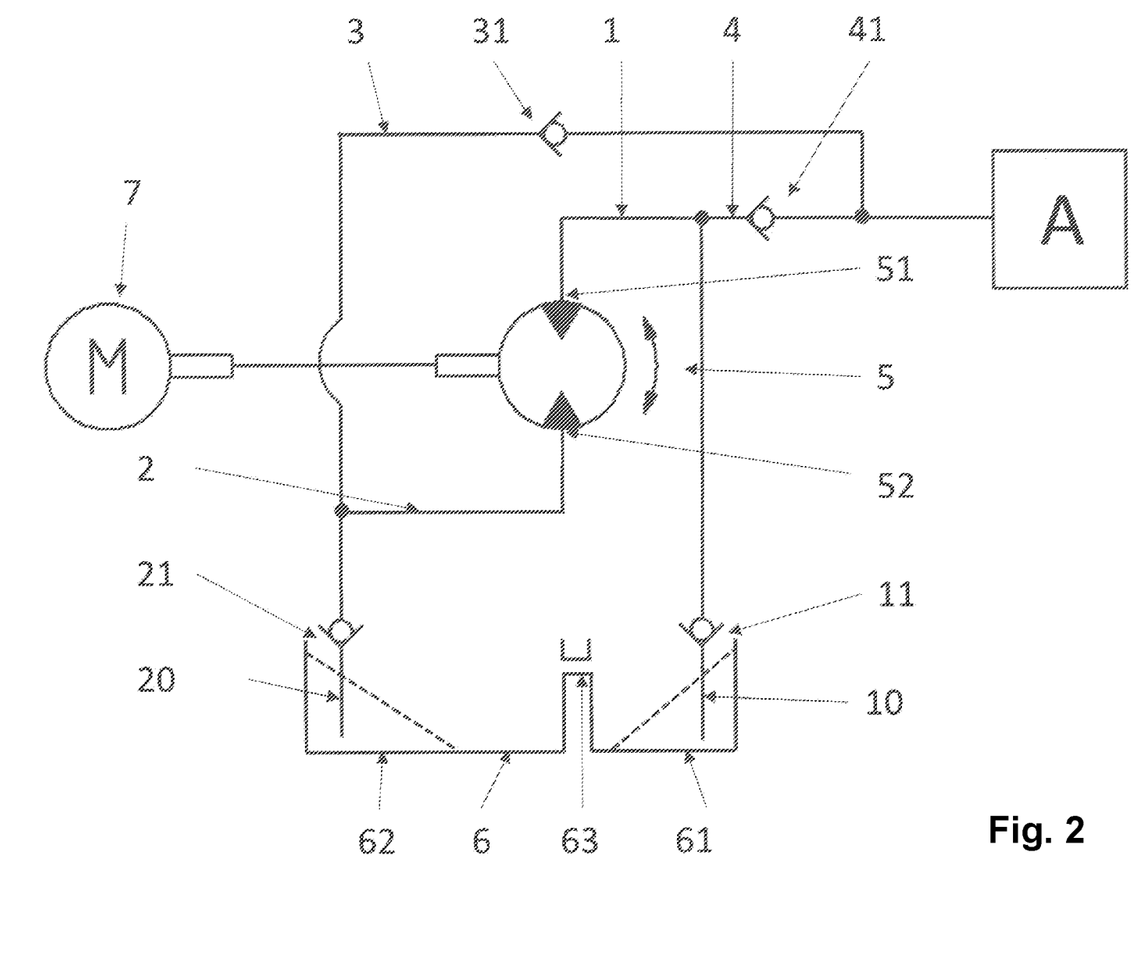
FIG. 2 a hydraulic circuit diagram according to a second example embodiment.

FIG. 2 shows a fluid delivery system according to a second example embodiment. The fluid delivery system according to FIG. 2 differs from the fluid delivery system according to FIG. 1 only in the embodiment of the reservoir 6. Only the differences between the two example embodiments will therefore be discussed in the following. Features of the first example embodiment in FIG. 1 and their description also apply to the second example embodiment, providing they do not contradict the example embodiment according to FIG. 2.

The reservoir 6 in FIG. 2 differs from the reservoir 6 in FIG. 1 in that the reservoir is sub-divided into a main sump 61 and an ancillary sump 62. The main sump 61 and the ancillary sump 62 are fluidically connected to each other via an overflow 63. When the fluid delivery system is in operation, the fluid preferably flows from the machine assembly A back to the main sump 61, where it is aspirated by the rotary pump 5 in its normal mode via the first aspiration point 10 and discharged to the machine assembly A. The overflow 63 is embodied in the form of a separating wall of the reservoir 6, wherein the separating wall does not extend as far as in the depth direction of the reservoir 6 as the reservoir 6.

When the rotary pump 5 is in its alternative mode, it aspirates the fluid from the ancillary sump 62 via the aspiration point 20. If the fluid delivery system is provided as a fluid delivery system for an engine and/or gear system of a motor vehicle, the fluid can flow from the main sump 61 to the ancillary sump 62 and/or from the ancillary sump 62 to the main sump 61 via the overflow 63 when centrifugal forces are acting on the fluid.

If the fluid is pressed onto the left-hand side of the reservoir 6, as shown by a dashed line in the ancillary sump 62 in FIG. 2, it can transpire that the aspiration point 10 is above the fluid level in the main sump 61. This lowers the power consumption of the electric motor 7 when the rotary pump 5 is in its normal mode, and the motor controller switches the electric motor 7 from its normal mode to its alternative mode if the power consumption falls below the threshold value.

The overflow 63 then ensures that when the centrifugal forces on the fluid cease and in particular when the motor controller automatically switches from the alternative mode back to the normal mode, sufficient fluid remains in the main sump 61, such that the first aspiration point 10 is below the fluid level in the main sump 61.

According to the example embodiment in FIG. 2, the main sump 61 has a smaller holding volume than the ancillary sump 62. In alternative embodiments, the main sump 61 and the ancillary sump 62 can have the same holding volume, or the ancillary sump 62 can have a smaller holding volume than the main sump 61.

Figure 3:
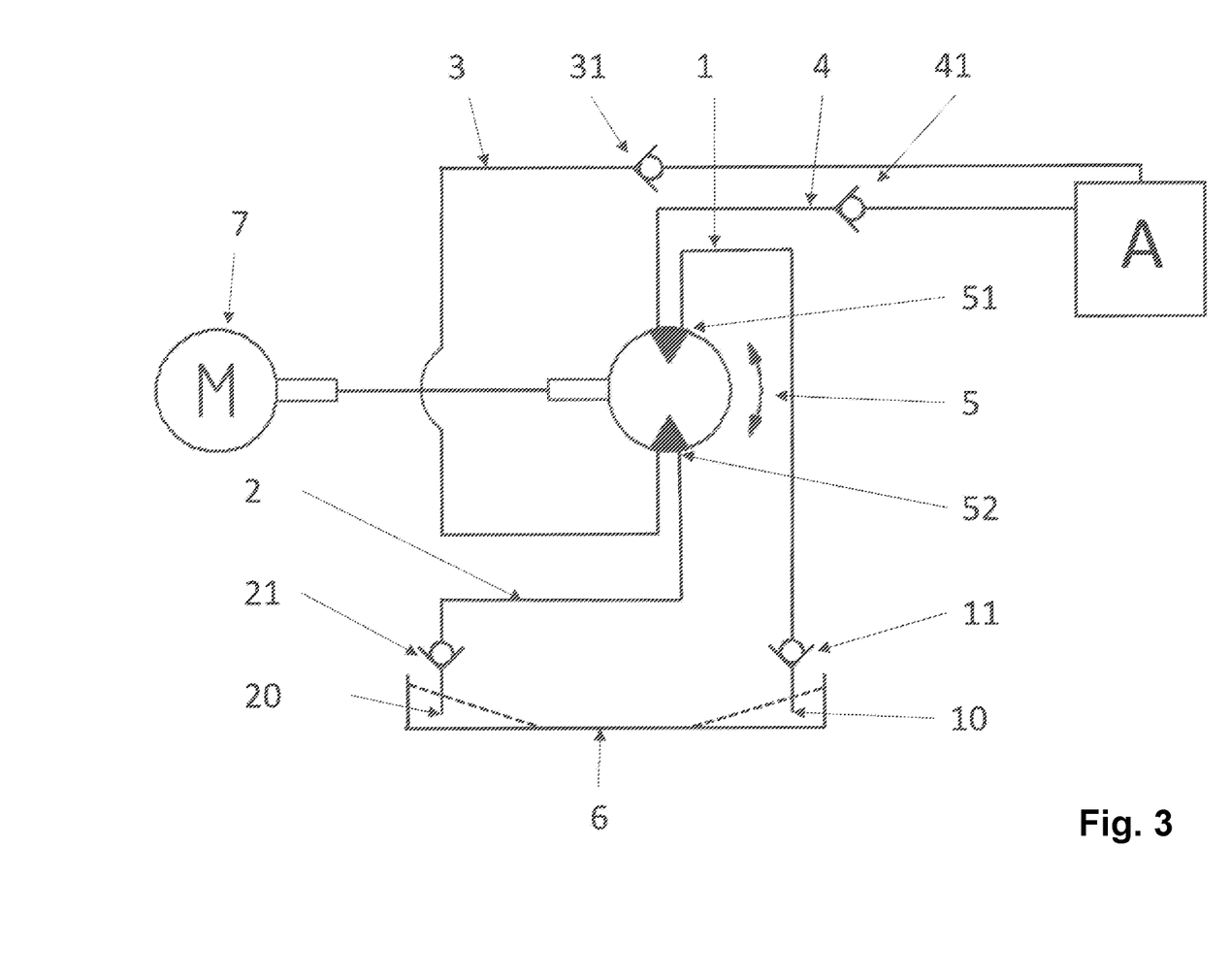
FIG. 3 a hydraulic circuit diagram according to a third example embodiment.

The example embodiment according to FIG. 3 differs from the example embodiments in FIGS. 1 and 2 in the embodiment of the fluid conduits. Only the essential differences between the third example embodiment and the two preceding example embodiments will therefore be discussed in the following. Features of the first example embodiment and the second example embodiment and their description also apply to the third example embodiment, providing they do not contradict the example embodiment according to FIG. 3.

Contrary to the two preceding example embodiments, the fourth fluid conduit 4 does not emerge into the first fluid conduit 1 at its end which faces away from the machine assembly A. The fourth fluid conduit 4 extends from the first pump port 51 up to the machine assembly A. The first fluid conduit 1 extends from the first pump port 51 up to the first aspiration point 10 via the first valve 11. The first pump port 51 is thus connected, in particular directly connected, to both the first fluid conduit 1 and the fourth fluid conduit 4.

The third fluid conduit 3 also does not emerge into the second fluid conduit 2 at its end which faces away from the machine assembly A. The third fluid conduit 3 also does not emerge into the fourth fluid conduit 4 at its end which faces the machine assembly A. The third fluid conduit 3 thus extends from the second pump port 52 up to the machine assembly A. The second fluid conduit 2 extends from the second pump port 52 up to the second aspiration point 20 via the second valve 21. The second pump port 52 is thus connected, in particular directly connected, to both the third fluid conduit 3 and the second fluid conduit 2.

The invention claimed is:

1. A fluid delivery system for supplying fluid to an engine or gear system of a motor vehicle for lubricating and/or cooling the engine or gear system, the fluid delivery system comprising:
   a) a reservoir for storing the fluid;
   b) a rotary pump having a first pump port and a second pump port;
   c) a drive for driving the pump and comprising an electric motor;
   d) a motor controller for actuating the electric motor, wherein the motor controller comprises monitoring electronics for detecting that air is being suctioned;
   e) a first fluid conduit featuring a first valve and a second fluid conduit featuring a second valve,
   f) wherein the fluid is oil for lubricating and/or cooling engine or gear system, and
   g) wherein the first fluid conduit connects the pump port to the reservoir, and the second fluid conduit connects the second pump port to the reservoir, and
   h) the rotary pump can be operated in a normal mode, in which it rotates in a first delivery direction, and an alternative mode in which it rotates in a second delivery direction, wherein
   i) the first valve is configured to separate the first pump port from the reservoir when the rotary pump is in its alternative mode, and the second valve is configured to separate the second pump port from the reservoir when the rotary pump is in its normal mode, wherein
   j) the monitoring electronics are provided to monitor a power consumption of the electric motor as a function of an actual rotational speed of the rotary pump and/or electric motor and/or an actual temperature of the fluid and/or rotary pump, and wherein
   k) the motor controller is configured to change the rotational direction of the electric motor when the power consumption falls below a threshold value.

2. The fluid delivery system according to the claim 1, wherein when it is in its normal mode, the rotary pump suctions the fluid via the first pump port and discharges it via the second pump port, and when the rotary pump is in its alternative mode, it suctions the fluid via the second pump port and discharges it via the first pump port.

3. The fluid delivery system according to claim 1, wherein the first fluid conduit emerges into the reservoir at a first aspiration point, and the second fluid conduit emerges into the reservoir at a second aspiration point, wherein the first aspiration point and the second aspiration point are spaced apart from each other.

4. The fluid delivery system according to claim 1, wherein the reservoir comprises a main sump, an ancillary sump and an overflow, wherein the fluid flows from the machine assembly back to the main sump, and the main sump is fluidically connected to the ancillary sump via the overflow.

5. The fluid delivery system according to claim 4, wherein the first fluid conduit emerges into the reservoir at a first aspiration point, and the second fluid conduit emerges into the reservoir at a second aspiration point,
   wherein the first aspiration point and the second aspiration point are spaced apart from each other, and
   wherein the first aspiration point emerges into the main sump and the second aspiration point emerges into the ancillary sump.

6. The fluid delivery system according to claim 1, further comprising a third fluid conduit which features a third valve and connects the second pump port to the machine assembly, and a fourth fluid conduit which features a fourth valve and connects the first pump port to the machine assembly.

7. The fluid delivery system according to claim 6, wherein the third fluid conduit emerges into the second fluid conduit at its end which faces away from the machine assembly, and the fourth fluid conduit emerges into the first fluid conduit at its end which faces away from the machine assembly.

8. The fluid delivery system according to claim 7, wherein when the rotary pump is in its alternative mode, the third valve prevents a fluid flow outside a delivery chamber of the rotary pump from the first pump port to the second pump port, and when the rotary pump is in its normal mode, the fourth valve prevents a fluid flow outside the delivery chamber of the rotary pump from the second pump port to the first pump port.

9. The fluid delivery system according to claim 6, wherein when the rotary pump is in its alternative mode, the third valve prevents a fluid flow outside a delivery chamber of the rotary pump from the first pump port to the second pump port, and when the rotary pump is in its normal mode, the fourth valve prevents a fluid flow outside the delivery chamber of the rotary pump from the second pump port to the first pump port.

10. The fluid delivery system according to claim 6, wherein the first valve is formed by a first check valve, the second valve is formed by a second check valve, and wherein the third valve is formed by a third check valve and the fourth valve is formed by a fourth check valve.

11. The fluid delivery system according to claim 1, wherein both the first valve and the second valve are formed by a check valve.

12. The fluid delivery system according to claim 1, wherein the motor controller changes the rotational direction of the electric motor for at least one second or at least five seconds when the power consumption as a function of the actual rotational speed of the rotary pump and/or electric motor and/or the actual temperature of the fluid and/or rotary pump falls below a threshold value.

13. A method for operating a fluid delivery system according to claim 1, the method comprising:
  a) a power consumption of the electric motor is detected;
  b) an actual rotational speed of the rotary pump and/or an actual temperature of the fluid and/or rotary pump is detected;
  c) the power consumption is compared with a threshold value for the power consumption, wherein the threshold value is predetermined or determined as a function of the detected actual rotational speed and/or the detected actual temperature of the fluid and/or rotary pump; and
  d) the motor controller switches the electric motor from its normal mode to its alternative mode or from its alternative mode to its normal mode, if the power consumption falls below the threshold value.

14. The fluid delivery system according to claim 1, wherein the monitoring electronics are configured for detecting that air is being suctioned through the first and/or second fluid conduit.

15. The fluid delivery system according to claim 1, wherein the motor controller changes the rotational direction of the electric motor for at least one second or at least five seconds when the power consumption as a function of the actual rotational speed of the rotary pump and/or electric motor and/or the actual temperature of the fluid and/or rotary pump falls below a threshold value.

16. A method for operating a fluid delivery system for supplying fluid to a machine assembly, the system comprising an electric motor which rotates in a first rotational direction when it is in a normal mode and in a second rotational direction when it is in an alternative mode, a rotary pump which is driven by the electric motor and suctions the fluid from a reservoir via a first pump port and discharges it via a second pump port when the electric motor is in its normal mode and suctions the fluid from the reservoir via the second pump port and discharges it via the first pump port when the electric motor is in its alternative mode, and a motor controller comprising monitoring electronics, the method comprising:
  a) a power consumption of the electric motor is detected;
  b) an actual rotational speed of the rotary pump and/or an actual temperature of the fluid and/or rotary pump is detected;
  c) the power consumption is compared with a threshold value for the power consumption, wherein the threshold value is predetermined or determined as a function of the detected actual rotational speed and/or the detected actual temperature of the fluid and/or rotary pump; and
  d) the motor controller switches the electric motor from its normal mode to its alternative mode or from its alternative mode to its normal mode, if the power consumption falls below the threshold value.

* * * * *